June 30, 1925.

J. E. CHAMBERS

COOKING STOVE

Filed April 17, 1924 — 2 Sheets-Sheet 1

1,543,694

INVENTOR.
JOHN E. CHAMBERS,
BY
ATTORNEY.

June 30, 1925.
J. E. CHAMBERS
COOKING STOVE
Filed April 17, 1924  2 Sheets-Sheet 2
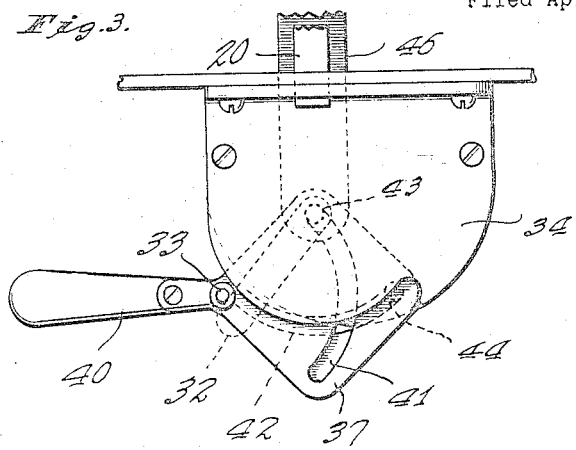
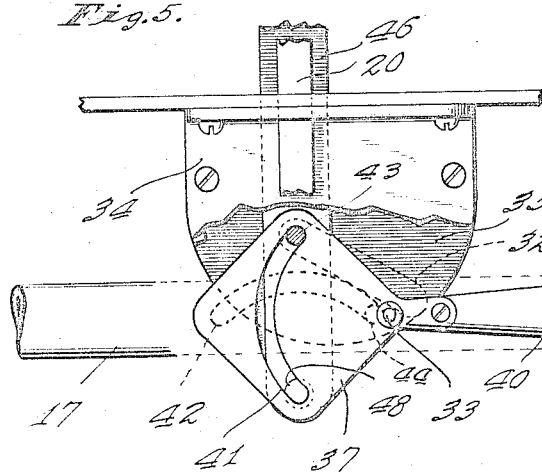
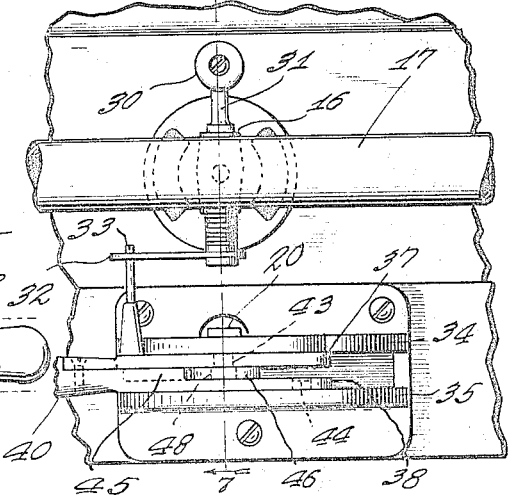
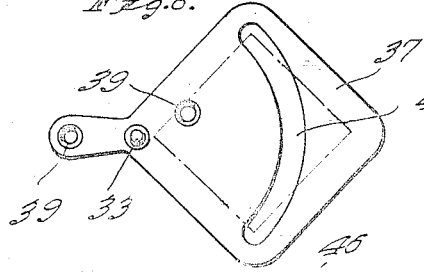
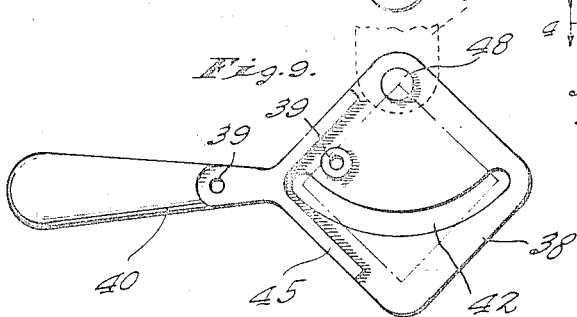
INVENTOR.
JOHN E. CHAMBERS,
BY
ATTORNEY.

Patented June 30, 1925.

1,543,694

UNITED STATES PATENT OFFICE.

JOHN E. CHAMBERS, OF SHELBYVILLE, INDIANA.

COOKING STOVE.

Application filed April 17, 1924. Serial No. 707,259.

*To all whom it may concern:*

Be it known that I, JOHN E. CHAMBERS, a citizen of the United States, residing at Shelbyville, in the county of Shelby and State of Indiana, have invented a new and useful Cooking Stove, of which the following is a specification.

It is the object of my invention to provide a safety-interlock between the heating-control and the ventilation-control of an oven, with particular reference to a gas-heating oven having heat-insulating walls.

More specifically, it is the object of the present invention to provide an interlock which automatically prevents the closing of the ventilation until the gas or other heat has been substantially turned off, and which automatically prevents the turning on of the gas or other heat until the ventilation has been opened; and to make it possible to permit full ventilation even though the gas or other heat is turned off. In other words, it is the object to make the shutting off of the gas and the ventilation successive, desirably with a single movement of a single operating handle; and to make the opening of the ventilation and the turning on of the gas also successive.

Figure 1:
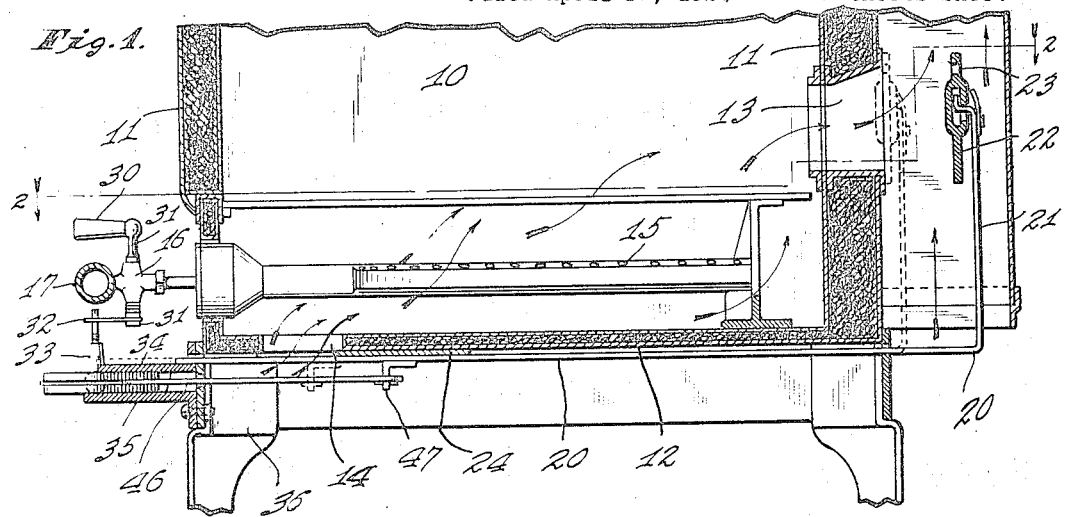
Figure 2:
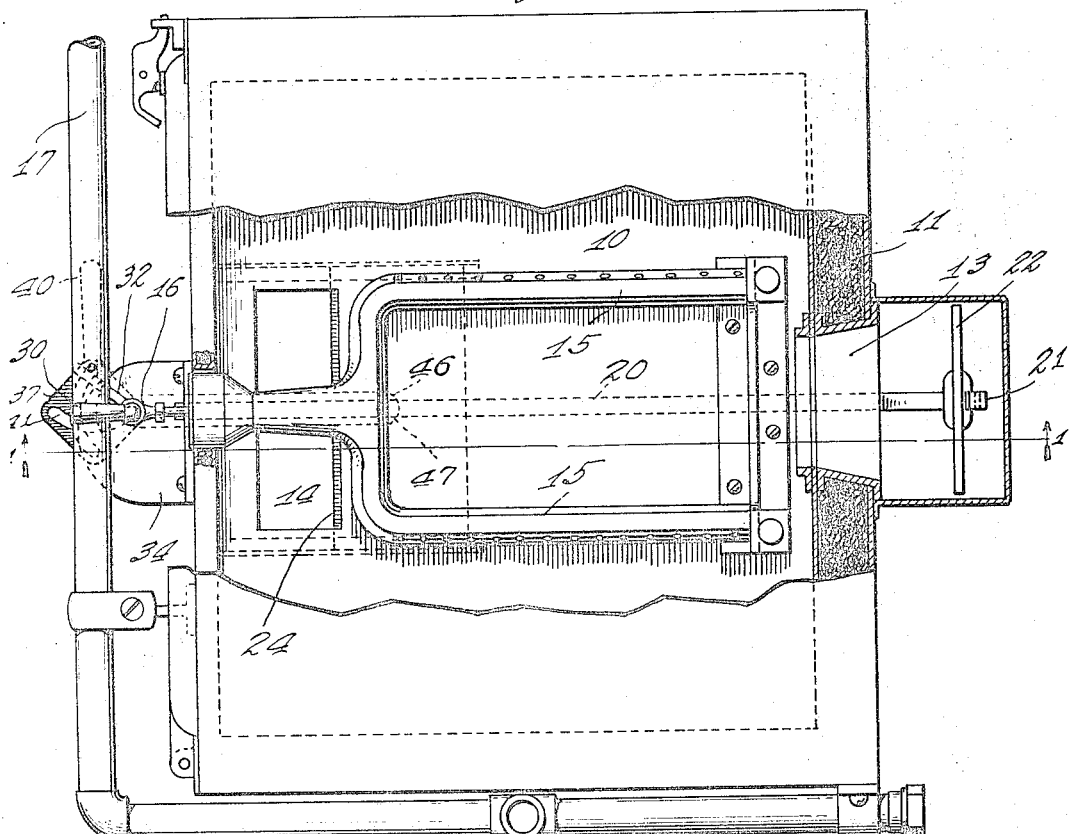

The accompanying drawings illustrate my invention: Fig. 1 is a vertical transverse section through an oven embodying my invention, the section being taken substantially on the line 1—1 of Fig. 2; Fig. 2 is a plan of the oven shown in Fig. 1, with some parts broken away, and some parts in section on the line 2—2 of Fig. 1; Fig. 3 is a plan of the interlock, being a section substantially on the line 3—3 of Fig. 7, though with some of the parts cut by such section line shown in dotted lines in order the better to show the parts below, and showing the parts in position with the gas turned on and the ventilation open; Fig. 4 is a section substantially on the line 4—4 of Fig. 7, with the gas turned off and the ventilation open; Fig. 5 is a view similar to Fig 4, showing the parts in position with the gas turned off and the ventilation closed; Fig. 6 is a front elevation of the interlocking mechanism, including the gas valve; Fig. 7 is a transverse section substantially on the line 7—7 of Fig. 6; and Figs. 8 and 9 are separate plan views of the two members which together make up the interlock complete.

The oven 10 to which my invention is applied is shown as having heat-insulated walls 11, and a heat-insulated bottom 12, with a ventilating opening 13 cut through the rear wall 11, and a ventilating opening 14 in the bottom 12. When these openings are uncovered, there may be an air circulation through the oven as indicated generally by the arrows. The oven also has the usual oven burner 15, near the bottom, which burner is shown as a gas burner controlled by a gas-valve 16 and connected to the main gas-supply pipe 17 of the range of which the oven 10 may form part.

Mounted below the bottom 12 of the oven is a slidable bar 20 which is slidable forwardly and rearwardly to control the ventilating openings 13 and 14. This bar is provided with an upturned rear arm 21, which at its upper end carries a loosely hung plate 22 which when the bar 20 is moved forward covers the outlet of the ventilating opening 13, as is indicated in dotted lines in Fig. 1; while when the bar 20 is moved to the rear, to the full-line position shown in Fig. 1, such plate 22 recedes from the opening 13 and leaves the latter unrestricted. The plate 22 may have a small opening 23 through it, so that even when it is in its forward position it does not completely close the opening 13, but allows some passage of air, steam, or other gases. The bar 20 also carries near its forward end a plate 24, which slidably co-operates with the opening 14 in the oven-bottom 12 to close such opening when the bar 20 is shifted forward and to open such opening when the bar 20 is shifted to the rear. The bar 20 extends forward beyond the front wall of the oven, so that it may conveniently be guided, and so that the amount of its projection will indicate the extent to which the ventilation openings are closed.

The bar 20 and the gas-valve 16 are interlocked, so that the gas cannot be turned on when the ventilating openings are closed, and the ventilating openings cannot be closed when the gas is turned on; and so that the closing of the gas valve and of the ventilation openings will be successive, and their opening also successive but in reverse order.

The gas-valve 16 has the usual operating handle 30, which is shown in Figs. 1 and 2 in valve-opening position, in which it is transverse to the pipe 17. When the handle 30 is turned to 90° in a counter-clockwise direction from the position shown in Fig. 2, it closes the gas-valve 16, as is common with gas valves on cook stoves. From the lower end of the stem 31 of the gas-valve 16 extends an interlock arm 32; which, as shown, is somewhat angularly displaced in a clockwire direction from the operating handle 30. (See Fig. 2). This interlock arm 32 co-operates with a post 33 extending upwardly from an interlock-plate which is mounted to move in a horizontal plane between upper and lower supporting plates 34 and 35 projecting forward from the front of the supporting base of the oven 10. The interlock-plate comprises an upper plate 37 and a lower plate 38, shown separately in Figs. 8 and 9. These two plates are adapted to be superposed, and fastened together by suitable fastening screws passing through mating holes 39 in the two plates. The post 33 extends upward from the upper plate 37. The lower plate 38 is provided with an operating handle 40, which may be swung from the position shown in Figs. 2 and 3, through the position shown in Fig. 4, to the position shown in Fig. 5, to produce corresponding movements of the interlock plate.

The two plates 37 and 38 of the interlock plate are provided respectively with quarter-circle slots 41 and 42, each of which is drawn with one end of the other slot as its center, so that the two slots overlap as indicated clearly in Figs. 3, 4, and 5. In other words, the center for the arc of the slot marked 41 is the clockwise end of the slot 42, and the center of the arc for the slot 42 is the counter-clockwise end of the slot 41. The slot 41 co-operates with a downwardly projecting pin 43 from the stationary plate 34; while the slot 42 co-operates with an upwardly extending pin 44 from the stationary plate 35. When the interlock plate is in the intermediate position shown in Fig. 4, with the gas-valve closed and the ventilation open, each pin 43 and 44 is in that end of its associated slot 41 or 42 that is the center for the other slot 42 or 41.

The two plates 37 and 38 are slightly spaced apart, by an upstanding edge-flange 45 on the plate 38 to provide a space between them to receive the forward end of an operating rod 46 which is attached to the rod 20 at an intermediate point thereof and extends forward from such intermediate point for co-operation with the interlock plate 37—38. The operating rod 46 has a swinging connection 47 to the rod 20, to permit the relative free movement necessary between such two rods. The forward end of the operating rod 46 is pivoted to an upstanding pivot lug 48 from the lower plate 38. The lug 48 is preferably substantially at the center for the curved slot 42.

When the parts are in the position shown in Figs. 1, 2, and 3, the gas-valve 16 is open and the ventilation of the oven is also open. The post 33 projects upward on the clockwise side of the interlock arm 34, so that it is possible for the operator to close the gas-valve 16 and to move it back again to open position without affecting the ventilation of the oven, if she so desires.

However, ordinarily when the housewife turns off the gas for the oven, she usually wishes to retain the heat in the oven. If she wishes to do this, she operates both the gas-valve and the ventilation-control through the handle 40. She swings such handle 40 from the position shown in Fig. 3 through the position shown in Fig. 4 to the position shown in Fig. 5; she may stop for awhile if she wishes in the position shown in Fig. 4, though usually there is no reason for doing so. As the handle 40 is swung from the position shown in Fig. 3 to the position shown in Fig. 4, the pin 43 is the center of movement. In consequence, during this movement the operating rod 46 is not affected, and the ventilation remains open as indicated in Figs. 1 and 2. However, as the interlock plate swings from the position shown in Fig. 3 to the position shown in Fig. 4, the post 33 is moved through 90° about the pin 43 as the center, and carries the interlock arm 32 with it. For convenience, to simplify the motion, the stem 31 and the pin 43 are in vertical alinement. As this movement of the interlock arm takes place, the gas-valve 16 is closed, and so the oven fire is turned off. Thus the oven fire is turned off before the ventilation is affected. If now the arm 40 is swung on from the position shown in Fig. 4 to the position shown in Fig. 5, the pin 44 becomes the center of movement; and then the operating rod 46 is drawn forward to close the openings 13 and 14 by the movement of the closing plates 22 and 24. With the ventilation thus closed, the gas-valve 16 is positively locked against being opened. In order to re-light the gas for the oven, it is necessary first to swing the arm 40 from the position shown in Fig. 5 to the position shown in Fig. 4, about the pin 44 as the center. By this movement, the plates 22 and 24 are moved rearwardly and the ventilation is re-opened. It is now possible to turn on the gas by manipulation of the handle 30, which will carry the interlock plate and the arm 40 with it, to or toward the position shown in Fig. 3, during which movement the interlock plate swings about the pin 43 as a center. Usually, however, the arm 40 will be swung separately all the way to the position shown in Fig. 3, and then the gas-valve handle 30 opened separately and manipulated separately as desired. In any case, ventilation cannot be closed until the gas has been turned off, and the gas cannot be turned on until the ventilation has been opened.

I claim as my invention:—

1. In combination, an oven having heat-insulating walls and ventilation-control means, heating means for said oven, a control device for said heating means, a movable member having a pivotal connection with said ventilation-control means, said member being rotatable about the axis of such pivotal connection to control the operation of said heat-control device.

2. In combination, an oven having heat-insulating walls and ventilation-control means, heating means for said oven, a control device for said heating means, a movable member having a pivotal connection with said ventilation-control means, said member being rotatable about the axis of such pivotal connection to control the operation of said heat-control device only when said ventilation-control means is open.

3. In combination, an oven having heat-insulating walls and ventilation-control means, heating means for said oven, a control device for said heating means, a movable member operatively connected to said ventilation control means, said movable member operating through a portion of its range of movement to control said heat-control device without moving said ventilation-control means and operating through another portion of its range of movement to move said ventilation-control means without affecting said heat-control device.

4. In operation, an oven having heat-insulating walls and ventilation-control means, heating means for said oven, a control device for said heating means, a movable member operatively connected to said ventilation control means, said movable member operating through a portion of its range of movement to control said heat-control device without moving said ventilation-control means.

5. The combination set forth in claim 3 with the addition of means to prevent movement of said movable member through that portion of its range of movement in which said heat-control means is actuated except when said ventilation-control means is in open position.

6. The combination set forth in claim 4 with the addition of means to prevent movement of said movable member through that portion of its range of movement in which said heat-control means is actuated except when said ventilation-control means is in open position.

7. The combination set forth in claim 3 with the addition of means to prevent movement of said movable member through that portion of its range of movement in which said ventilation-control means is moved except when said heating means is shut off.

8. In combination, an oven having heat-insulating walls and ventilation-control means, heating means for said oven, a control device for said heating means, a member successively rotatable through a predetermined distance about each of two axes, means for preventing rotation of such member about either axis until the limit of its rotation about the other axis has been reached, said member being arranged to control said ventilation-control means in its rotation about one axis and to control said heat-control means in its rotation about the other axis.

9. In combination, an oven having heat-insulating walls and ventilation-control means, heating means for said oven, a control device for said heating means, a member successively rotatable through a predetermined distance about each of two axes, said member being arranged to control said ventilation control means in its rotation about one axis and to control said heat-control means in its rotation about the other axis, and means for preventing rotation of said member to control said heat-control means except when said ventilation-control means is open.

10. In combination, an oven having heat-insulating walls and ventilation-control means, heating means for said oven, a control device for said heating means, a member successively rotatable through a predetermined distance about each of two axes, said member being arranged to control said ventilation control means in its rotation about one axis and to control said heat-control means in its rotation about the other axis.

11. In combination, an oven having heat-insulating walls and ventilation-control means, heating means for said oven, a control device for said heating means, a movable member, said member being provided with a pair of arcuate slots, one end of each of said slots being substantially coincident with the axis of the other slot, a stationary pin in each of said slots, said member having a pivotal connection with said ventilation-control means on an axis substantially coincident with the axis of one of said slots, and means carried by said member for controlling said heat-control device when said member is rotated about the axis of its pivotal connection with said ventilation-control means.

12. The combination set forth in claim 11 with the addition that said arcuate slots lie in separated parallel planes so that they do not intersect.

In witness whereof, I have hereunto set my hand at Indianapolis, Indiana, this 15th day of April, A. D., one thousand nine hundred and twenty-four.

JOHN E. CHAMBERS.